(12) United States Patent
Fok et al.

(10) Patent No.: US 7,974,745 B2
(45) Date of Patent: Jul. 5, 2011

(54) AVIONIC AVIATION SYSTEM WITH A GROUND STATION FOR AUTOMATIC ELIMINATION OF RESULTANT FAILURES IN AIRCRAFT, AND CORRESPONDING METHOD

(75) Inventors: Marcel Fok, Zürich (CH); Shinji Shirai, Räterschen (CH)

(73) Assignee: Swiss Reinsurance Company, Zürich (CH)

( * ) Notice: Subject to any disclaimer, the term of this patent is extended or adjusted under 35 U.S.C. 154(b) by 617 days.

(21) Appl. No.: 12/019,519

(22) Filed: Jan. 24, 2008

(65) Prior Publication Data
US 2008/0177428 A1 Jul. 24, 2008

(51) Int. Cl.
*G05D 1/08* (2006.01)
(52) U.S. Cl. .................. 701/7; 701/14; 701/29; 701/35; 701/36; 701/120; 342/36

(58) Field of Classification Search .................. 701/2, 3, 701/7, 14, 29, 33, 35, 36, 120; 340/961; 342/36
See application file for complete search history.

(56) References Cited

U.S. PATENT DOCUMENTS
5,890,079 A * 3/1999 Levine .......................... 701/14
5,974,349 A * 10/1999 Levine .......................... 701/29
* cited by examiner

*Primary Examiner* — Gertrude Arthur Jeanglaud
(74) *Attorney, Agent, or Firm* — Oblon, Spivak, McClelland, Maier & Neustadt, L.L.P.

(57) ABSTRACT

An avionic aviation system including: a ground station that is linked to an aircraft via a wireless interface; wherein the ground station includes, a receiver that receives, via a wireless interface, a transmission from a detection device integrated in avionics of the aircraft, said transmission including a parameter regarding at least one of takeoff and landing of the aircraft, and a counter module that increments a value based on the parameter regarding at least one of takeoff or landing for the aircraft.

26 Claims, 2 Drawing Sheets

AVIONIC AVIATION SYSTEM WITH A GROUND STATION FOR AUTOMATIC ELIMINATION OF RESULTANT FAILURES IN AIRCRAFT, AND CORRESPONDING METHOD

BACKGROUND

1. Technological Field

The invention relates to an avionic aviation system with a ground station for automatic elimination of resultant failures in aircraft. The avionic aviation system is linked to a multiplicity of aircraft via a wireless avionics interface. By means of a switching device of the ground station of the aviation system, dedicated failure deployment devices are activated for automatic failure elimination if a failure detected by means of a sensor occurs in an aircraft.

2. Prior Art

In the last twenty years, the quantity of goods and people transported via aircraft has increased enormously worldwide. The dependencies of industry and the economy on air traffic are manifold. As in the case of any technical device, however, failures also occur again and again in aircraft. The causes of these vary and range from material wear, material fatigue, poor maintenance of the aircraft or of the landing strips, incorrect behavior by pilots and air traffic controllers to incorrect or inaccurate weather forecasts. However, even with careful training of the pilots, excellent maintenance of the aircraft and careful flight preparation, failures cannot be ruled out, something which is intrinsic in the complexity of the systems involved. The causes and backgrounds of air accidents and failures are not always easy to determine. The greatly increasing extent of air traffic in recent years additionally requires automation at all levels. However, automation without human interaction has not been possible to date in the prior art, particularly for eliminating failures. In spite of the large number of goods and people transported by aircraft, operational stoppages in the case of aircraft are not subject to the laws of large numbers. Firstly, the technical complexity in the design of the aircraft with generally a plurality of engines and a few thousand interacting sensors and operational units leads to behavior which cannot be predicted by the persons skilled in the art in extreme cases. Secondly, the physics, for example of the wings, and their dynamics and of the fuselage, is also by no means understood technically in such a way that the aircraft designed show flight behavior predictable for all cases. On the contrary, most of the design technology of the wings and of the aircraft body is still based on empirical values and not technically predicted forms. Aircraft themselves are moreover greatly dependent on weather in their behavior during operation. The weather itself is at present neither truly predictable nor calculatable for relatively long periods but is subject to chaotic, highly nonlinear processes which cannot be extrapolated for arbitrarily long periods. Efficient and stable automation of the elimination of failures thus eludes the avionic aviation systems known in the prior art. As mentioned, the sharp increase in air traffic in recent years has created a need for novel aviation systems which can efficiently eliminate and effectively absorb failures. Firstly, failures should be prevented; secondly, their occurrence should be detected in good time and eliminated, as far as possible before a catastrophe occurs. Efficient elimination of failures by means of an aviation system does of course also help to minimize the economic consequences for the operator, which gives him advantages, particularly in competition with other operators. In the elimination of the failure, a role is played not only by the type of devices used for eliminating failures (e.g. failure deployment devices, such as automatic extinguishing systems, locking and control mechanisms, alarm and signal devices, switching and activation devices or catastrophe deployment devices, etc) but also by the manner in which measured control parameters are filtered, processed and technically implemented for controlling the means deployed. Particularly in the case of real-time acquisition, analysis and management of the measured parameters of such systems, it is frequently the technical implementation which presents problems which can scarcely be overcome. The enormous quantity of data available today at any time from a very wide range of acquisition devices and detection devices (e.g. wind speed sensors, satellite images, water level sensors, water and wind temperature sensors, etc) makes monitoring and steering by purely human action and perception possible only with difficulty. The technical implementation of such aviation systems should, if possible, therefore interact in a fully automated manner and in real-time both with the acquisition devices and with the failure deployment devices. Even only partial human interactions are no longer possible in aviation technology in many cases in relation to quantity of signals and/or speed of reaction. In the case of complex systems, human interaction also has the disadvantage that its susceptibility to errors does not increase linearly as a function of the complexity. The behavior or the operation of the system becomes unpredictable. Unexpected operational stoppages or system crashes are the result. There have recently been many examples of this, such as, for example, system-generated operational stoppages in systems coupled with human interaction, for example, in spite of all emergency intervention devices and systems, unforeseeable aircraft crashes, such as, for example, the MD11 crash of Swissair before Halifax on Nov. 3, 1998, or the air accident at Überlingen in July 2002 etc.

Although failures in aircraft, both in passenger air transport and in cargo transport, have also become more frequent as a result of the increasing quantity transported, it is still true of aircraft failures that the prior art has far fewer empirical values than in the case of failures in other technical areas. This relates, for example, to the number of existing units in operation with comparable historical events. As a result of this, statistical empirical values, such as, for example, the "law of large numbers" substantially cannot be used for realizing an aviation system for eliminating failures. In addition, in many cases of failures in aircraft, it is difficult to determine the true cause in spite of complicated technical auxiliary devices, such as the black box and seamless monitoring of the aircraft trajectory. This makes it difficult to base automated deployment devices for eliminating failures or corresponding electronic switching and signal-generating systems on the necessary causality or to obtain any corresponding data at all. In the prior art, attempts have been made, for example, to base corresponding data on the affected landing strips, types of aircraft used or the quantity of aircraft operated (for example by means of market shares of the operator, such as, for example, turnover, etc). Known systems of this type are, for example, RPK (revenue passenger kilometer), AVF (average fleet value), etc. For example, the behavior of the operator can be taken into account thereby. One of the disadvantages of this system is that the turnover merely reflects the instantaneous and directly following future and only very indirectly permits the technical breakdown of the causes or failures. In addition, there is a direct dependence technically between the turnover and the resultant failures in the rarest cases. Some systems of the prior art are also based on the number of operational aircraft, the number of aircraft being taken as a boundary parameter for the type and for the technical possibilities for realizing an automated aviation system for eliminating failures. In certain circumstances, these systems better reflect the occurrence of failures. However, not all operators of aircraft need use the same technical equipment, technical know-how, maintenance of the machines, air bases, etc, to say nothing of using them identically for all aircraft operated. This greatly absorbs the dependency, with the result that the realization of such systems in turn acquires uncertainties and requires a large error tolerance. Other aviation systems of the prior art are based in their technical implementation on the so-called burning rate method. One of the problems of the burning rate method is based on the difficulty of extrapolating failures and their empirical values to future failures. This is due, inter alia to the complexity and nonlinearity of the external influences on the operation of the aircraft.

In the aviation systems of the prior art, human interaction is still a necessary precondition in many areas for differentiated signal generation. Particularly in the case of failures, the complexity of the devices involved, parameters acquired or processes to be controlled and interactions with the environment is exceeded to an extent which permits human interaction to a lesser and lesser extent. Particularly in the control, checking and monitoring of the dynamic and/or nonlinear processes which lead to failures, automation of detection eludes the prior art. Frequently, it is in particular the nonlinearity which makes automation impossible for conventional devices. Many technical implementations of different types of early warning devices or image and/or pattern recognition devices, particularly in the case of analogue measured data or in the case of the necessary self-organization of the device, have not yet been satisfactorily solved to date in the prior art. Most natural processes at least partly have a nonlinear course and tend to behave exponentially outside a narrow linear equilibrium area. For aircraft, efficient and reliably functioning early warning signal generation and automated failure elimination will therefore be important for survival. Efficient failure elimination comprises complex technical assemblies of the aircraft as well as the many thousand sensors and measured signals, or monitoring and control systems based on environmental influences which are difficult to monitor, such as meteorological (storms, hurricanes, floods, thermals) influences. Automation of failure elimination should be able to take account of all these influences without adversely affecting the reaction rate of failure elimination. Such systems have not been known to date in the prior art. The international patent WO 2004/045106 (EP1563616) describes a system of the prior art by means of which operational data of an aircraft can be collected and can be transmitted via communication means of the on-board system to a ground station. European patent EP 1 455 313 describes another system of the prior art, it being possible for flight and operation parameters to be monitored by a so-called aircraft condition analysis and management system (ACAMS) and for arising or expected failures to be detected. European patent EP 1 630 763 A1 describes a further monitoring and checking system. This system is intended to avoid arising failures based on the communicated measured parameters. The alarm device described is based in particular on forecast trajectories of the monitored aircraft which are generated by means of the system. In the case of imminent failures, an appropriate alarm signal is automatically generated. U.S. Pat. No. 6,940,426 describes a system for probability determination of resulting failures in aircraft. Here, different measured parameters of both historical events and dynamically detected events are acquired and taken into account accordingly in the signal generation. The European patent EP 1 777 674 describes a checking and control system for landings and takeoffs of aircraft. The measured parameters can be simultaneously acquired from a plurality of coordinated aircraft, managed and used for monitoring signal generation. European patent EP 1 840 755 A2 describes a further aviation system for avoiding and eliminating failures. A multiplicity of measured parameters of the aircraft are communicated to a ground station. This compares the measured data, for example, with manufacturer's data in real-time and, in the event of a difference, generates an appropriate control signal and/or control software for the avionics of the aircraft or of the operator. U.S. Pat. No. 5,500,797 describes a checking system which detects failures in the aircraft and stores measured parameters. The stored measured parameters can be used in the analysis of the failure. In particular, measured data are thus acquired for future failures and can be used for controlling failure deployment devices. Finally, European patent EP 1 527 432 B1 describes an avionic aviation system for stationary flight monitoring of aircraft. Based on the communicated data, for example, an appropriate alarm signal can be automatically produced and checking and control functions generated.

SUMMARY

It is an object of this invention to propose an avionic aviation system with ground station for automatic elimination of resulting failures in aircraft, which do not have the above-mentioned disadvantages. In particular, the achievement should make it possible to provide a fully automated, electronic aviation system which reacts and/or adapts dynamically to changed conditions and operational stoppages. Furthermore, it should be an achievement which makes it possible to design the avionic aviation system in such a way that variable causality and dependency of the failures (e.g. place of deployment, type of deployment, operation of the aircraft, external influences, such as, for example, weather, landing strips, etc) are taken into account with the necessary accuracy by the aviation system and integrated into the technical implementation so that human interaction is not necessary.

According to the present invention, this aim is achieved in particular by the elements of the independent claims. Further advantageous embodiments are also evident from the dependent claims, the description and the drawings.

In particular, these aims are achieved by the invention in that the avionic aviation system with ground station for automatic elimination of resulting failures in aircraft is linked to a multiplicity of aircraft via a wireless interface of the aircraft avionics, a dedicated failure deployment device for automatic failure elimination being activated by means of a switching device of the ground station if a failure detected by means of a sensor occurs, in that the aviation system comprises detection devices integrated in the aircraft avionics for electronic acquisition of implemented takeoff and/or landing units of the aircraft, those log parameters of the implemented takeoff and/or landing units which are coordinated with an aircraft being transmitted from the detection devices via the wireless interface to the ground station for takeoff and landing, in that the ground station comprises an incrementable Techlog stack with readable stack height value for each aircraft, the Techlog stack height value being incremented by means of a counter module based on filtered takeoff and/or landing units of the transmitted log parameters of the respective aircraft after transmission of the parameters, in that the counter module comprises a means for reading the Techlog stack altitude value and the ground station comprises a filter module, by means of which filter module a memory threshold for enabling the activation of the failure deployment device on the basis of the Techlog stack altitude values is determined dynamically for a certain time window, in that the ground station comprises an activation stack of a protected memory module for acquiring activation parameters of the aircraft, the activation parameters being transmitted to the ground station on the basis of the actual memory threshold and the activation stack being incremented stepwise according to the transmitted activation parameters, and in that an activation stack height value of the activation stack is cumulatively acquired by means of a counter module of the ground station and, if the dynamically determined memory threshold is reached with the activation stack height value, the switching device for dedicated activation of failure deployment means in the case of resulting failures is enabled by means of the filter module. The coordinated log parameters can be transmitted directly to the ground station, for example by means of the wireless interface of the aircraft avionics, via a satellite-based network. However, the coordinated log parameters, can, for example, also be transmitted to the ground station by means of the wireless interface of the aircraft avionics (on-board system) via a wireless communication network of an approached landing strip. The detection devices can, for example, be completely integrated into the aircraft avionics. However, the landing strips can, for example, also comprise at least parts of the detection device. The detection device can, for example, be realized at least partly as a component of a monitoring system of a landing strip, for example of an airport or of an airfield. The detection device can, for example, also be realized partly as a component of a monitoring system of a flight service provider and/or flight operation provider. This has the advantage that no further technical adaptations or realizations apart from those already present are necessary in the aircraft avionics. Thus, for example, the detection device can be realized on any possible airbase/landing strip or the cycles can be otherwise acquired and communicated to the aviation system. The invention has, inter alia, the advantage that a standard, fully automated avionic aviation system which can be technically integrated into the existing electronics of the aircraft (avionics) and comprises a ground station for automatic elimination of resulting failures in aircraft can be realized by means of the device according to the invention. This has not been possible to date in the prior art since the automations without human interaction frequently had unforeseeable instabilities. Operational stoppages in the case of aircraft are not subject to the laws of large numbers, in spite of the large number of goods and people transported by aircraft. Firstly, the technical complexity in the design of the aircraft having in general a plurality of engines and a few thousand interacting sensors leads to unpredictable behavior for the persons skilled in the art in extreme cases. Secondly, the physics, for example of the wing dynamics, is also by no means technically understood so completely that aircraft show predictable behavior in flight in all cases. On the contrary, most of the design technology of the wings and of the aircraft body is still based on empirically gathered values and not technically predicted or calculated forms. Aircraft themselves are additionally strongly weather-dependent in their operation. The weather itself is at present technically neither truly predictable nor calculable but is subject to chaotic, highly nonlinear processes. Efficient and stable automation of the elimination of failures thus eluded the avionic aviation systems known in the prior art. The aviation system according to the invention with ground station now eliminates these deficiencies in the prior art and for the first time permits the realization of an appropriate, automated avionic aviation system. A further advantage is that causality and dependency of the failures can be acquired and used with the necessary accuracy by means of the aviation system according to the invention, at least partly on the basis of cycles (takeoff and landing). Thus, dynamically adapted operational security can be guaranteed by means of automated failure elimination. In the special case of working examples with additionally monetary value-based parameters, the aviation system for the first time permits complete automation of the additional tariff classification of the failure at all levels. This too was not possible in this way to date in the prior art. As mentioned, the activation parameters are determined in a variable manner by means of the filter module on the basis of the detected number of takeoff and/or landing units. It may also be expedient, for example, dynamically or partly dynamically to detect the takeoff and/or landing units by means of measuring sensors of the detection device. The ground station is thus dynamically signaled via the implemented takeoffs and landings of an aircraft. As a variant, for example, landing strip-specific data of the coordinated landing/takeoff strip for aircraft, such as, for example, air cargo transport means and/or air passenger transport means, can also be dynamically detected by means of sensors and/or detection means of the detection device. The aircraft coordinated with the aviation system have detection devices with an interface to the ground station and/or landing strip and/or satellite-based network. The interface to the ground station can be realized, for example, by means of an air interface. This variant has, inter alia, the advantage that the aviation system permits real-time acquisition of the cycles (takeoff/landing). This also gives rise to the possibility of dynamic adaptation of the operation of the aviation system in real-time to the actual conditions and/or in particular corresponding real-time adaptation of the activation parameters. The technical implementation of the method thus acquires the possibility of self-adapting of the aviation system. This also permits complete automation. This type of automation is not possible with any of the devices of the prior art.

In one variant, the failure deployment means are selected by means of the filter module on detection of a failure by means of the sensor of the aviation system according to the resulting failure and/or the effected aircraft type and are activated by means of the switching device. This variant has the advantage that the activated failure deployment means can be specifically selected for eliminating the arising failure by means of the filter module and can be adapted to the arising failure and/or location of the failure. For example, for this variant, the filter module may comprise corresponding realized expert systems, neuronal network modules. In particular, the filtering and selection can be realized, for example, by means of adapted lookup tables. This permits automation of the aviation systems on the basis of the system according to the invention in a manner which was not even nearly possible to date in the prior art.

In another variant, on detection of a failure by means of the sensor, the failure deployment means can be selected by means of the filter module additionally on the basis of the activation stack height value and can be selectively activated by means of the switching device. This variant has, inter alia, the advantage that the aviation system can react dynamically to the communicated activation parameters. The memory threshold and the accumulated activation parameters thus need not necessarily be identical. This permits dynamic adaptation of the selected failure deployment devices on the basis of the communicated activation parameters, for example by means of the filter module.

In a further variant, the log parameters additionally comprise measured value parameters of the flight management system (FMS) and/or of the inertial navigation system (INS) and/or of the fly-by-wire sensors and/or flight monitoring devices of the aircraft, the memory threshold being generated by means of the filter module dynamically for the respective time window on the basis of the Techlog stack height value and the additional log parameters. This variant has, inter alia, the advantage that, for example, the aviation system can be adapted dynamically and in real-time by means of the additional log parameters. Likewise, for example the means of the filter module, the activation parameters and/or the memory threshold can be dynamically adapted to the type and probabilities of a failure by means of the additional log parameters.

In yet another variant, the avionics of the aircraft comprises an altitude-measuring sensor and/or an airspeed indicator and/or a vertical speed indicator and/or an attitude indicator and/or a turn indicator and/or an acceleration indicator and/or a stall warning sensor and/or an exterior temperature sensor and/or a position determination sensor, the log parameters additionally comprising measured parameters of at least one of the sensors, and the memory threshold being generated by means of the filter module dynamically for the respective time window on the basis of the Techlog stack height value and the additional log parameters. For example, position-dependent parameters can be generated by means of a GPS module of the position determination module of the detection device and can be communicated to the ground station. This variant has, inter alia, the same advantages as the preceding ones. In the case of the variant with position determination module, the failure deployment device can be checked and controlled at any time with respect to the position of the failure event, for example, by means of the aviation system. As mentioned, for example, position coordinate parameters of the actual location of the aircraft can consequently be generated by means of the position determination module of the detection device and can be transmitted to the ground station for initiating the intervention for eliminating a failure by means of the failure deployment devices selected in a dedicated manner. For example, the failure of the aircraft can be eliminated in an automated or at least semi automated manner by means of at least one failure deployment device on detection of an intervention event. This variant has, inter alia, the advantage that the failure deployment devices, such as, for example, automated extinguishing devices, alarm devices in the case of aids or intervention units, such as, for example, police or fire brigade deployment units, automated locking or switch-off/switching units, etc, can be optimized and/or activated in an automated manner and/or in real-time on the basis of the actual location of the flight means. In addition to automated devices for direct intervention, the failure deployment device may also additionally comprise monetary value-based transmission modules. Since, for example, position coordinate parameters of the actual location of the aircraft can be generated by means of the position determination module of the detection device and can be communicated to the ground station, the activation parameters and/or the memory threshold can be dynamically adapted to the probabilities of the occurrence of a failure, for example by means of the filter module. For example, difficult landing strips, such as, for example, Hong Kong, can be assigned higher activation parameters or memory thresholds while landing strips having high safety, such as, for example, Frankfurt or Zurich, can be assigned lower values in the case of the activation parameters and/or of the memory threshold. The behavior and environmental influences are thus taken into account completely and dynamically in the operation of the aircraft. This was not possible to date in the prior art. The same applies to acquired measured parameters of the altitude-measuring sensor, of the air speed indicator, of the vertical speed indicator, of the attitude indicator, of the turn indicator, of the acceleration indicator, of the stall warning sensor or of the exterior temperature sensor of the aircraft.

In one variant, measured ATIS parameters based on the Automatic Terminal Information Service (ATIS) of the landing strip approached are transmitted automatically to the ground station for each landing and takeoff unit by means of the avionics of the aircraft or the communication means of the landing strip, the memory threshold being dynamically determined for the respective time window on the basis of the Techlog stack height value and being dynamically adapted by means of the measured ATIS parameters. This variant has, inter alia, the same advantages as the preceding one. In particular, it is possible to adapt, for example, the aviation system dynamically and in real-time on the basis of the measured ATIS parameters. Likewise, for example by means of the filter module, the activation parameters and/or the memory threshold can be dynamically adapted to the type and probabilities of a failure by means of the measured ATIS parameters.

In another variant, first activation parameters dynamically determined by means of the filter module of the ground station are transmitted to the avionics of the aircraft and/or to a supplementary on-board system coordinated with the respective aircraft and, for incrementing the activation stack, protected second activation parameters are generated by the avionics or the coordinated supplementary on-board system and transmitted to the ground station. The protected second activation parameters may comprise, for example, a uniquely assignable identification number or another electronic identification (ID), such as, for example, an IMSI. This variant has, inter alia, the advantage that the second activation parameters and the first activation parameters need not be identical. This permits, for example, dynamic adaptation of the selected failure deployment devices on the basis of the second activation parameters by means of the filter module. By means of the protected attachment of a uniquely assignable identification number, the activation parameters can in particular be communicated, for example also simply via networks, or can be processed by decentralized systems.

In a further variant, the ground station comprises an interface for accessing one or more databases comprising landing strip-specific data records, each takeoff and/or landing unit detected by means of the detection device and acquired as log parameters being coordinated with at least one landing strip-specific data record, and the log parameters being weighted and/or generated with a weighting by means of a weighting module on the basis of the coordinated landing strip-specific data record. The aviation system may additionally comprise, for example, means for the dynamic updating of one or more databases with landing strip-specific data records, it being possible for the updating of the landing strip-specific data records to be realized periodically and/or on request. The one or more databases can be assigned, for example, in a decentralized manner to a landing strip for aircraft, data being transmitted unidirectionally and/or bidirectionally to the ground station by means of an interface. This variant has, inter alia, the same advantages as the preceding variant. In particular, real-time adaptation of the aviation system, for example in relation to the technical conditions at the landing strips used, is possible by access to the databases comprising records specific to landing and/or takeoff units. This makes it possible always to keep the aviation system at the latest level in an automated manner. This may be important in particular when taking into account new developments and introductions of technical systems for increasing safety, etc, in the cycles. Furthermore, the realization of the databases has the advantage that data, such as, for example, metadata can be generated from acquired data and can be dynamically updated by means of a filter module or suitable decentralized filter means. This permits fast and easy access. In the case of a local database at the ground station with periodic updating, for example, the aviation system can further function dynamically even when the links to individual landing strips are interrupted from time to time.

In yet another variant, an electrical clock signal having a reference frequency is generated by means of an integrated oscillator of the filter module, the filter module periodically determining the variable activation parameter and/or, if appropriate, transmitting it to the corresponding incrementable stack on the basis of the clock signal. This variant has, inter alia, the advantage that the individual modules and units of the technical implementation of the aviation system can be easily synchronized and matched to one another.

At this point, it should be stated that the present invention relates not only to the aviation system according to the invention comprising a ground station but also to a corresponding method.

Variants of the present invention are described below with reference to examples. The examples of the embodiments are illustrated by the following attached figures:

DETAILED DESCRIPTION

Figure 1:
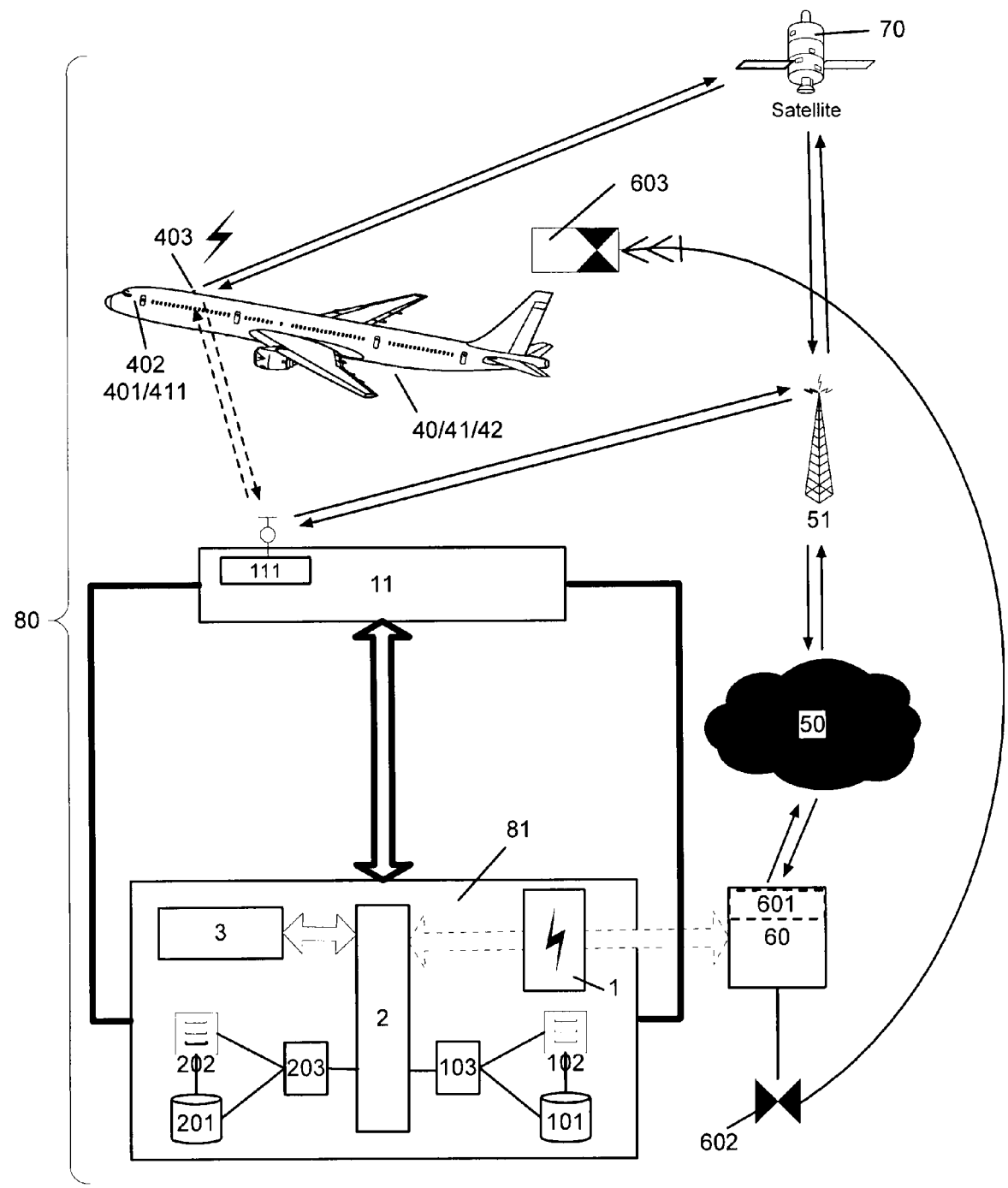
FIG. 1 shows a block diagram which schematically represents a working example of an avionic aviation system 80 according to the invention comprising ground station 81 for automatic elimination of resulting failures in aircraft 40/41/42. The avionic aviation system 80 is linked to a multiplicity of aircraft 40/41/42 via a wireless interface 403 of the avionics 402. By means of a switching device 1 of the ground station 81, a dedicated failure deployment device 603 for automatic failure elimination is activated if a failure detected by means of a sensor 3/401/601 occurs. Based on the log parameters, i.e. in particular the measured cycles, a filter module 2 changes the control of the switching device 1.
Figure 2:
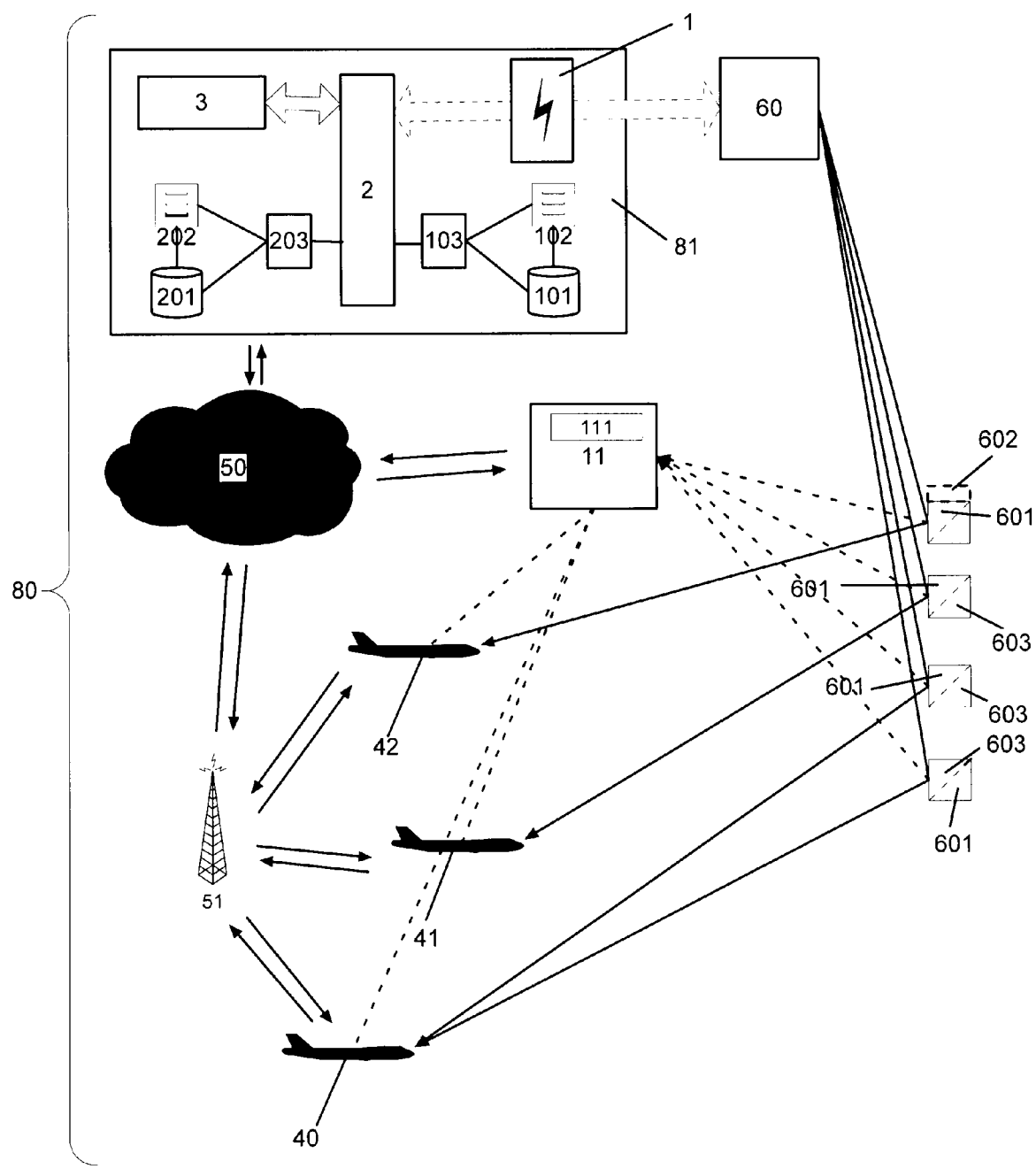
FIG. 2 likewise shows a block diagram which schematically represents a working example of an avionic aviation system 80 according to the invention comprising ground station 81 for automatic elimination of resulting failures in aircraft 40/41/42. The avionic aviation system 80 is linked to a multiplicity of aircraft 40/41/42 via a wireless interface 403 of the avionics 402. By means of a switching device 1 of the ground station 81, a dedicated failure deployment device 603 for automatic failure elimination is activated if a failure detected by means of a sensor 3/401/601 occurs.

FIGS. 1 and 2 illustrate an architecture which can be used for realizing the invention. In this working example, the avionic aviation system 80 with ground station 81 for automatic elimination of resulting failures in aircraft 40/41/42 is linked to a multiplicity of aircraft 40/41/42 via a wireless interface 403 of the avionics 402 of the aircraft 40, 41, 42. The aviation system 80 with ground station 81 may be, for example, part of a technical system of an operator of aircraft 40, . . . , 42, such as, for example, of an airline or air cargo/air freight transport company, but also of a manufacturer of aircraft, such as Airbus or Boeing, or flight monitoring services. The aircraft may comprise, for example, aircraft for cargo transport 40/41 and/or passenger transport 42 and/or air ships, such as zeppelins, or even shuttles or other flight means for space travel. The aircraft 40, . . . , 42 can likewise comprise motorized and non-motorized flight means, in particular gliders, power gliders, hang gliders and the like. For a certain failure event, a dedicated failure deployment device 603 for automatic failure elimination is activated by means of a switching device 1 of the ground station 81 if a failure detected by means of a sensor 3/401/601 occurs. The ground station 81 and/or the failure deployment devices 603 may comprise in particular in some cases, for example, automated emergency and alarm devices with monetary-value based transmission modules. For example, at least partly for detecting a failure, the sensor 3/401/601 can be integrated into the avionics 402 of the aircraft 40, . . . , 42, the control device of the failure elimination devices 603 and/or the ground station 81 and/or landing strip 11. The failure deployment device 603 may be, for example, checking or alarm devices or systems for direct technical intervention in the affected aircraft 40, . . . , 42, at the operator of the aircraft 40, . . . , 42 and/or at the landing strip 11 and/or at the ground station 81, which is affected on detection of corresponding failures. Of course, a plurality of aircraft 40, . . . , 42, ground stations 81 and/or landing strips 11 may simultaneously be affected or be covered by means of the aviation system. The failure elimination can take place, for example, by coupled and/or stepwise technical interventions, such as, for example, initiation of different checking services or throttling and metering filters in corresponding metering devices or valves, etc. Failure elimination devices 603 which are activated, for example, by the aviation system 80, for example in the sense of automated or partly automated emergency interventions (or the initiation thereof) by medically trained personnel or automated initiation of flight-related emergency situations, such as transport of sick persons, etc, for which the alarm is given by means of signal data generated by means of the aviation system 80 and selectively communicated, are also possible. For example, for controlling the devices 603 by means of the aviation system 80 for automated elimination in the case of failures, failure elimination devices 603 can be linked unidirectionally or bidirectionally by means of an interface to the aircraft 40, . . . , 42 and/or the ground station 81 and/or the landing strip 11. The reference number 60 describes the intervention device as a whole comprising the communication interface 601, possibly with sensor for measurement of failures, the control device 602 for electronic monitoring and for control of the failure deployment device 603, and the failure deployment device 603.

By means of the sensor 3/401/601, a resulting failure is detected, and by means of the filter module 2 the failure deployment means 603 are selected, for example, according to the resulting failure and/or the effected aircraft type 40, . . . , 42, and are activated by means of the switching device 1. The aviation system 80 comprises detection devices 411 integrated into the avionics 402 of the aircraft 40/41/42. By means of the detection devices 411, implemented takeoff and/or landing units of an aircraft 40/41/42 are electronically acquired, corresponding log parameters of the implemented takeoff and/or landing units, which are coordinated with the aircraft 40, . . . , 42, being transmitted from the detection devices 411 via the wireless interface 403 to the ground station 81. The log parameters can be acquired, for example, at least partly in the form of absolute value parameters. By means of the wireless interface 403 of the avionics 402 of the aircraft 40, . . . , 42, for example, the coordinated log parameters can be transmitted directly to the ground station 81 via a satellite-based network 70. The coordinated log parameters can also be transmitted to the base station 81, for example, via a wireless communication network 111 of a landing strip 11 which is being approached. For each aircraft, 40, . . . , 42, the ground station 81 comprises an incrementable Techlog stack 202 with readable stack height value. The Techlog stack height value is incremented by means of a counter module 203 of the ground station 81 on the basis of filtered takeoff and/or landing units of the transmitted log parameters of the respective aircraft 40, ..., 42. The counter module 203 likewise comprises means for reading the Techlog stack height value. By means of a filter module 2 of the ground station 81, a memory threshold for enabling the activation of the failure deployment device 603 is dynamically determined for a certain time window on the basis of the Techlog stack height values. The ground station 81 comprises an activation stack 102 of a protected memory module 103, by means of which activation parameters of the aircraft 40, ..., 42 are acquired. The activation parameters are transmitted to the ground station 81 on the basis of the actual memory threshold, and the activation stack 102 is incremented stepwise according to the transmitted activation parameters. The activation parameters may comprise, as a special case, at least partly monetary/or monetary value-based absolute values, in particular electronically protected parameters. As a variant, first activation parameters can be dynamically determined, for example by means of the filter module 2 of the ground station 81, and can be transmitted to the avionics (402) of the aircraft 40, ..., 42 and/or to a supplementary off-board system 404 coordinated with the respective aircraft 40, ..., 42. For incrementation of the activation stack, for example, protected second activation parameters are generated by the avionics 402 or the coordinated supplementary off-board system 404 and transmitted to the ground station 81. The protected second activation parameters may comprise, for example, a uniquely assignable identification number. By means of a further counter module 103 of the ground station 81 the activation stack height value of the activation stack 102 is cumulatively acquired. The acquisition can be effected, for example, periodically and/or on request and/or can take place during communication. If the dynamically determined memory threshold is reached with the activation stack height value, the switching device 1 for dedicated activation of the failure deployment means 603 in the case of resulting failure is enabled by means of the filter module 2.

The variable activation parameter or memory threshold is determined, for example periodically, by means of the filter module 2 on the basis of the detected number of takeoff and/or landing units or of log parameters and can be transmitted to the activation stack 102 on being communicated back to the ground station 81. The filter module 2 and/or the counter modules 103/203 may comprise an integrated oscillator, by means of which oscillator an electrical clock signal having a reference frequency can be generated, the filter module 2 and/or the counter modules 103/203 being capable of being periodically activated on the basis of the clock signal. The variable activation parameter and/or activation stack can be determined dynamically or partly dynamically, for example by means of the filter module 2 on the basis of the detected number of takeoff and/or landing units. As a variant, the failure deployment devices 603 can additionally be selected on the basis of the activation stack height value and activated by means of the switching device 1, for example for detection of a failure by means of the sensor 3/401/601. Likewise, the log parameters may additionally comprise, for example, measured value parameters of the flight management system (FMS) and/or of the inertial navigation system (INS) and/or of the fly-by-wire sensors and/or flight monitoring devices of the aircraft 40, ..., 42, the memory threshold being generated by means of the filter module dynamically for the respective time window on the basis of the Techlog stack height value and the additional log parameters. The avionics 402 of the aircraft 40, ..., 42 may also comprise, for example, an altitude-measuring sensor and/or an airspeed indicator and/or a vertical speed indicator and/or an attitude indicator and/or a turn indicator and/or an accelerator indicator and/or a stall warning sensor and/or an exterior temperature sensor and/or a position determination device. The position determination module of the detection device 411 may comprise, for example, at least one GPS module for generating position-dependent parameters which can be communicated. In said cases, the log parameters additionally comprise measured parameters of at least one of the sensors, the memory threshold being generated by means of the filter module 2 dynamically for the respective time window on the basis of the Techlog stack height value and the additional log parameters. Furthermore, for example, measured ATIS parameters based on the automatic terminal information service (ATIS) of the approached landing strip 11 can be automatically transmitted to the ground station 81 for each landing and takeoff unit (cycle) by means of the avionics 402 of the aircraft 40, ..., 42 or the communication means 111 of the landing strip 11, the memory threshold being generated dynamically for the respective time window on the basis of the Techlog stack height value and the transmitted measured ATIS parameters. The detection device 411 comprises, as mentioned, measuring sensors for the dynamic or partly dynamic detection of takeoff and/or landing units. As described for the avionics 403, the detection device 411 may comprise for this purpose, for example, an altitude-measuring sensor and/or an airspeed indicator and/or a vertical speed indicator and/or an attitude indicator and/or a turn indicator and/or an acceleration indicator and/or a stall warning sensor and/or an exterior temperature sensor and/or a position determination device. The detection device 411 may also comprise, for example, sensors and/or detection means for the dynamic detection of landing strip-specific data of the coordinated landing/takeoff strip for air transport means 40/41 and/or air passenger transport means 42. The coordinated air transport means 40/41 and/or air passenger transport means 42 may comprise, for example, the detection device 411 having an interface to the filter module 2 and/or to the user device 11. Said interface from the detection device 411 to the filter module 2 and/or to the user device 11 may comprise, for example, an air interface. In particular, the detection device 411 may comprise, for example, a position determination module for generating position-dependent parameters which can be communicated. The position determination module of the detection device 411 may comprise, for example, at least one GPS module for generating position-dependent parameters which can be communicated.

In one variant, the ground station 81 may comprise, for example, an interface for access to one or more databases comprising landing strip-specific data records. Each takeoff and/or landing unit (cycle) detected by means of the detection device 411 and acquired as a log parameter is coordinated with at least one landing strip-specific data record, the log parameters being weighted on the basis of the coordinated landing strip-specific data record by means of a weighting module. The aviation system 80 may furthermore comprise, for example, a means for dynamic updating of one or more databases with landing strip-specific data records. The updating of the landing strip-specific data record can be realized, for example, periodically and/or on request. The one or more databases may be assigned, for example, in a decentralized manner to a landing strip 11 for aircraft 40, ..., 42. By means of an interface 111, for example, data can be transmitted unidirectionally and/or bidirectionally from the landing strip 11 to the ground station 81. It is of course also possible for the landing unit-specific and/or takeoff unit-specific data records and/or data to be acquired by means of access to databases of public and/or partly public and/or private control stations and/or other databases of takeoff and landing strips. The data acquired can be stored in a coordinated manner, for example in a data storage, and can be updated, for example, periodically and/or on request. By means of this variant, different, for example, country-specific, conditions can be taken into account, such as, for example, technical and maintenance-related differences, for example between airports such as Frankfurt or Hong Kong (difficult landing conditions) and airports in a developing country, such as Angola or Uzbekistan (poor technical equipment). This has the advantage that changes in the takeoff and/or landing conditions, for example due to technical changes at the air strips, are immediately acquired, and the aviation system thus always remains up to date. In particular, this achieves automation of the system, which has not yet been reached in any manner by another method in the prior art. The aviation system 80 may also comprise, for example, said one or more databases in a coordinated manner. In this case data, such as, for example metadata, can be generated from acquired data, for example by suitable filter means, and can be dynamically updated. This permits fast and easy access. In addition, the automated alarm and intervention system can continue to function even when the links to user devices and/or acquisition units are interrupted. As mentioned, the data may also comprise in particular metadata which are extracted, for example, on the basis of a content-based indexing technique. As a working example, the metadata can be generated at least partly dynamically (in real-time) on the basis of the log parameters communicated by means of the detection devices 411. This has, for example, the advantage that the metadata always have the topicality and accuracy expedient for the system according to the invention. In a special working example, the failure deployment devices 603 may additionally comprise monetary value-based intervention means for monetary covering of the failure elimination in the aircraft 40, ..., 42. For this special case of these failure deployment devices 603, the activation parameters, i.e. the cases in which at least one of the failure deployment devices 603 is to be activated, are frequently statutorily regulated in a country-specific manner and comprise private systems and/or public systems and/or partly public systems. The avionic aviation system 80 can, as mentioned, comprise a multiplicity of landing strips 11 and/or ground stations 81 with aircraft 40, ..., 42 in a coordinated manner. The aircraft 40, ..., 42 and/or the landing strip 11 can be linked unidirectionally and/or bidirectionally to the ground station 81, for example via the communication network 50/51 and/or the satellite-based network 70. The communication network 50/51 and/or the satellite-based network 70 may comprise, for example, a GSM or a UMTS network or a satellite-based mobile radio network, and/or one or more fixed networks, for example the public switched telephone network, the worldwide Internet or a suitable LAN (local area network) or WAN (wide area network). In particular, it also comprises ISDN and XDSL connections. In the case of a unidirectional link, the communication network 50/51/70 may also comprise broadcast systems (e.g. digital audio broadcasting DAB or digital video broadcasting), in the case of which broadcast transmitters digital audio or video programs (television programs) and digital data, for example data for the performance of data services, program-associated data (PAD), are disseminated unidirectionally to broadcast receivers. This may be expedient depending on the variant. However, the unidirectional dissemination property of these broadcast systems can, inter alia, have the disadvantage that, particularly in the transmission by means of radio waves, a back-channel from the broadcast receivers to the broadcast transmitters or to operators thereof is lacking. Owing to this lacking back-channel, the possibilities for encryption, data security, settlement, etc of access-controlled programs and/or data are more limited.

The invention claimed is:

1. An avionic aviation system comprising:
   a ground station that is linked to an aircraft via a wireless interface; wherein the ground station includes,
   a receiver that receives, via a wireless interface, a transmission from a detection device integrated in avionics of the aircraft, said transmission including a parameter regarding at least one of takeoff and landing of the aircraft,
   a counter module that increments a value based on the parameter regarding at least one of takeoff or landing for the aircraft,
   a filter module that activates a failure deployment device based on the value determined by the counter for a certain time window,
   a memory module that stores activation parameters of the aircraft, the activation parameters being received by the ground station;
   incrementing a value of another counter module based on the activation parameters received by the ground station; and
   if a threshold, dynamically determined based on the value of the counter module, is reached by the another counter module, activating the failure deployment device with the filter module.

2. The avionic aviation system as claimed in claim 1, wherein, on detection of a failure by a sensor, the failure deployment device is selected by the filter module according to at least one of a resulting failure and an affected aircraft type.

3. The avionic aviation system as claimed in claim 2, wherein, on detection of the failure by the sensor, the failure deployment device is selected by the filter module additionally on a basis of a value of the another counter module.

4. The avionic aviation system as claimed in claim 1, wherein the parameter regarding at least one of takeoff and landing of the aircraft includes at least one of a measured value parameters of a flight management system (FMS), measured value parameters of a inertial navigation system (INS), measured value parameters of a fly-by-wire sensors, and measured value parameters of flight monitoring devices of the aircraft, and the threshold is generated by the filter module dynamically for the respective time window on the basis of the value of the counter module and the parameter.

5. The avionic aviation system as claimed in claim 4, further comprising:
   the aircraft,
   wherein the avionics of the aircraft includes at least one of an altitude-measuring sensor, an air speed indicator, a vertical speed indicator, an attitude indicator, a turn indicator, an acceleration indicator, a stall warning sensor, an exterior temperature sensor, a position determination device, the parameter regarding at least one of takeoff and landing of the aircraft additionally including measured parameters of at least one of the sensors, and the threshold being generated by the filter module dynamically for the respective time window on the basis of the value of the counter module and the parameters.

6. The avionic aviation system according to claim 1, wherein the ground station receives measured ATIS parameters based on a automatic terminal information system (ATIS) of a landing strip which is being approached for each landing and takeoff from the avionics of the aircraft or from a communication device of the landing strip, the threshold being generated dynamically for the respective time window on the basis of the value of the counter module and the received measured ATIS parameters.

7. The avionic aviation system according to claim 1, wherein first activation parameters dynamically determined by the filter module of the ground station are transmitted to at least one of the avionics of the aircraft and a supplementary on-board system coordinated with the aircraft, and second activation parameters are generated by the avionics or the supplementary on-board system and are received by the ground station and are counted by the another counter module.

8. The avionic aviation system as claimed in claim 7, wherein the second activation parameters include a uniquely assignable identification number.

9. The avionic aviation system claimed in claim 1, wherein the ground station receives the parameter regarding at least one of takeoff and landing via a satellite-based network.

10. The avionic aviation system according to claim 1, wherein the ground station receives the parameter regarding at least one of takeoff and landing via a wireless communication network of a landing strip.

11. The avionic aviation system according to claim 1, wherein the ground station includes an interface for access to one or more databases including landing strip-specific data records, each takeoff or landing detected by the detection device that is coordinated with at least one landing strip-specific data record, and the parameter regarding at least one of takeoff and landing is weighted by a weighting module on a basis of the coordinated landing strip-specific data record.

12. The avionic aviation system as claimed in claim 11, further comprising means for dynamically updating the one or more databases with landing strip-specific data records, the updating of the landing strip-specific data records being realized periodically or on request.

13. The avionic aviation according to claim 11, wherein the one or more databases are coordinated in a decentralized manner with a landing strip for the aircraft, and communication from the landing strip to the ground station is either unidirectionally or bidirectionally.

14. A method comprising:
  receiving with a receiver at a ground station linked to an aircraft, via a wireless interface, a transmission from a detection device integrated in avionics of the aircraft, said transmission including a parameter regarding at least one of takeoff and landing of the aircraft;
  incrementing a value of a counter module based on the parameter regarding at least one of takeoff or landing for the aircraft;
  activating, with a filter module of the ground station, a failure deployment device based on the value determined by the counter for a certain time window;
  storing, in a memory module, activation parameters of the aircraft, the activation parameters being received by the ground station,
  incrementing a value of another counter module based on the activation parameters received by the ground station, and if a threshold, dynamically determined based on the value of the counter module, is reached by the another counter module, the filter module activates the failure deployment device.

15. The method of claim 14, wherein, on detection of a failure by a sensor, selecting the failure deployment device according to at least one of a resulting failure and an affected aircraft type.

16. The method as claimed in claim 15, wherein, on detection of the failure by the sensor, selecting the failure deployment device additionally on a basis of a value of the another counter module.

17. The method as claimed in claim 14, wherein the parameter regarding at least one of takeoff and landing of the aircraft includes at least one of a measured value parameters of a flight management system (FMS), measured value parameters of a inertial navigation system (INS), measured value parameters of a fly-by-wire sensors, and measured value parameters of flight monitoring devices of the aircraft, and the method includes generating the threshold dynamically for the respective time window on the basis of the value of the counter module and the parameter.

18. The method as claimed in claim 17, wherein the avionics of the aircraft includes at least one of an altitude-measuring sensor, an air speed indicator, a vertical speed indicator, an attitude indicator, a turn indicator, an acceleration indicator, a stall warning sensor, an exterior temperature sensor, a position determination device, the parameter regarding at least one of takeoff and landing of the aircraft additionally including measured parameters of at least one of the sensors, and the method includes generating the threshold dynamically for the respective time window on the basis of the value of the counter module and the parameters.

19. The method of claim 14, further comprising:
  receiving, at the ground station, measured ATIS parameters based on a automatic terminal information system (ATIS) of a landing strip which is being approached for each landing and takeoff from the avionics of the aircraft or from a communication device of the landing strip; and
  generating the threshold dynamically for the respective time window on the basis of the value of the counter module and the received measured ATIS parameters.

20. The method according to claim 14, further comprising:
  dynamically determining, at the ground station, first activation parameters;
  transmitting, the first activation parameters to at least one of the avionics of the aircraft and a supplementary on-board system coordinated with the aircraft;
  receiving second activation parameters generated by the avionics or the supplementary on-board system at the ground station; and
  counting the second activation parameters with the another counter module.

21. The method as claimed in claim 20, wherein the second activation parameters include a uniquely assignable identification number.

22. The method as claimed in claim 14, further comprising:
  receiving, at the ground station, the parameter regarding at least one of takeoff and landing via a satellite-based network.

23. The method according to claim 14, further comprising:
receiving, at the ground station, the parameter regarding at least one of takeoff and landing via a wireless communication network of a landing strip.

24. The method according to claim 14, further comprising:
Accessing, with an interface of the ground station, one or more databases including landing strip-specific data records, each takeoff or landing detected by the detection device that is coordinated with at least one landing strip-specific data record; and
weighting the parameter regarding at least one of takeoff and landing on a basis of the coordinated landing strip-specific data record.

25. The method as claimed in claim 24, further comprising dynamically updating the one or more databases with landing strip-specific data records, the updating of the landing strip-specific data records being realized periodically or on request.

26. The method according to claim 24, wherein the one or more databases are coordinated in a decentralized manner with a landing strip for the aircraft, and communication from the landing strip to the ground station is either unidirectionally or bidirectionally.

* * * * *